Aug. 3, 1954
F. C. BOOSMAN
2,685,296
SHUTTLE VALVE
Filed Nov. 24, 1950
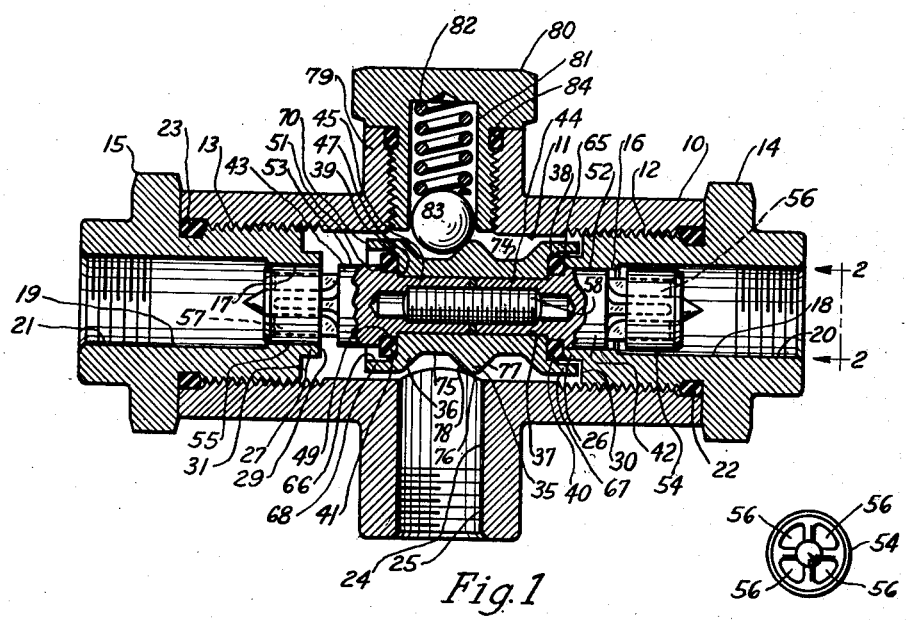
Fig. 1
Fig. 2
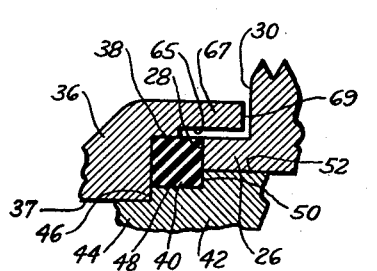
Fig. 3
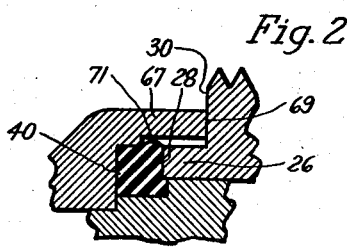
Fig. 4
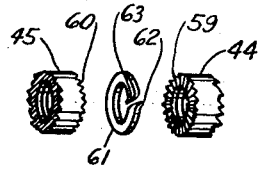
Fig. 5
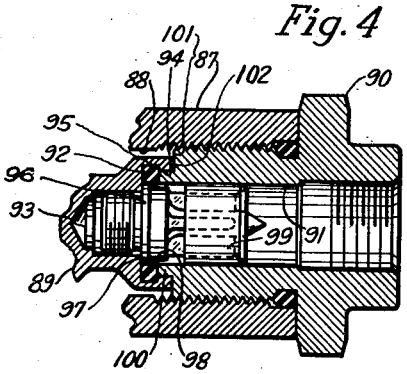
Fig. 6
INVENTOR.
FRANK C. BOOSMAN
BY John N. Wolfram
Agent Patented Aug. 3, 1954

2,685,296

UNITED STATES PATENT OFFICE 2,685,296

SHUTTLE VALVE

Frank C. Boosman, Los Angeles, Calif., assignor to The Parker Appliance Company, Cleveland, Ohio, a corporation of Ohio Application November 24, 1950, Serial No. 197,221

3 Claims. (Cl. 137—112)

1

This invention relates to valves and is particularly directed to the structure of a double ended valve member for a shuttle valve in which the valve member is adapted to alternately seat on one or the other of a pair of axially aligned valve seats formed in the valve casing.

One of the objects of the invention is to provide a double ended valve member, or shuttle, which is simple in design and which will efficiently operate in a valve body having a pair of spaced, axially aligned inlet ports in which the valve member is adapted to move between the ports for opening and closing the same alternately.

It is another object to provide a double ended valve member of the type described comprising a sleeve having recesses in each end and in which a distortable rubber-like gasket is clamped in each recess by retaining members which are suitably secured and locked in position.

It is another object to provide a valve of a type described in which the double ended valve member has cylindrical extensions on each end which are adapted to extend into the spaced inlet ports of the valve body and wherein portions of such extensions at all times remain in the respective ports for guiding the valve member in its movement between the valve seats.

It is another object of the invention to provide a valve of the type described in which each end of the double ended valve member is provided with guide surfaces receivable in respective port bores and in which each port is formed with a counterbore adjacent the bore whereby only the bore portions will be effective for guiding the valve member.

It is another object to provide a valve of the type described in which slight misalignment of the valve member with the inlet ports which it is adapted to alternately close will be held to a minimum and will not affect the tight seating of the parts.

Other objects of the invention will become apparent from a detailed description and from the drawings in which:

Figure 1 illustrates a longitudinal cross-section through a shuttle valve having a double ended valve member alternately engageable with a pair of spaced seats in the valve body.

Figure 2 is an end view of the guide extension on one end of the shuttle.

Figure 3 is a fragmentary section showing the initial contact of the rubber-like gasket in the valve member with the cooperating seat in the valve body.

Figure 4 is a view similar to Figure 3 except showing the parts in final and tight seating engagement with compression of the gasket by the body seat limited to a predetermined amount.

Figure 5 is a fragmentary view showing the locking means for preventing accidental un-

2 loosening of the inner ends of the retaining members for the gaskets of the valve member.

Figure 6 shows an alternate arrangement of the valve seats for carrying out the present invention when fluid pressure is acting on the opposite side of the valve member from that of Figure 1.

The shuttle valve as illustrated in Figure 1 includes a T-shaped body member 10 having a longitudinal bore 11 therethrough. Each end of this bore is threaded as at 12 and 13 for receiving adapters 14 and 15. Each adapter has a respective bore 16 and 17 at its inner end and counterbores 18 and 19 ending in threads 20 and 21 at the outer ends. Each of the adapters may be connected to a source of fluid under pressure by means of the threads 20 and 21. The joints between the adapters and the body are sealed by gaskets 22 and 23.

The valve body has an outlet bore 24 intersecting the central position of the bore 11. The outer end of the outlet bore 24 is threaded as at 25 for attachment to a suitable conduit or other part to which fluid is to be delivered.

The inner ends of the adapters 14 and 15 are formed with annular ribs 26 and 27, preferably having flat, transverse outer faces 28 and 29 and having spaced therefrom annular transverse abutment faces 30 and 31. The two adapters are so mounted that their bore portions 16 and 17 are in axial alignment with each other.

Mounted within the bore 11 is a double ended valve member, or shuttle, 35. It is comprised of a sleeve 36 having a bore 37 therethrough and having counterbores 38 and 39 at opposite ends of the bore. Located in the counterbores are deformable gaskets 40 and 41 of rubber or the like. The gaskets are held in place by a pair of identically formed retaining members 42 and 43.

The retaining members have reduced cylindrical portions 44 and 45 adapted to conformably fit within the bore 37 of the sleeve, and have shoulders 46 and 47 to limit the amount which the retaining members may enter the bore of the sleeve. Adjacent the shoulders 46 and 47 are cylindrical surfaces 48 and 49 which closely fit the inside diameters of the gaskets 40 and 41. Adjacent the cylindrical surfaces 48 and 49 are other shoulders 50 and 51 which engage the outer faces of the gaskets for retaining the same in the sleeve counterbores 38 and 39.

Outward of the shoulders 50 and 51, the retaining members have cylindrical portions 52 and 53 which conformably fit within the bores 16 and 17 of the adapters. Additional cylindrical portions 54 and 55 are spaced from the portions 52 and 53 and have passageways 56 and 57 formed in the central portions thereof.

The reduced portions 44 and 45 of the retaining members are internally threaded from their inner ends and a threaded stud 58 is mounted therein for holding the retaining members in place. The inner ends of the reduced portions 44 and 45 are serrated as at 59 and 60, as clearly shown in Figure 5. A split lock washer 61 having oppositely outwardly turned split ends 62 and 63 is interposed between the inner ends of the retaining members and the outwardly turned ends engage in the serrations for effectively locking the parts to prevent accidental unloosening of the retaining members on the threaded stud 58.

Outwardly of the counterbores 38 and 39 formed in the ends of the shuttle sleeve 35 are second counterbores 65 and 66. As clearly shown in Figures 3 and 4, the counterbores extend to a point approximately midway of the thickness of the gaskets 40 and 41 and are of a diameter slightly larger than the initial outer diameters of the gaskets and of the ribs 26 and 27, the outer diameters of the gaskets and ribs being substantially equal. The counterbores 65 and 66 are formed within annular flanges 67 and 68 and portions of these flanges overlie portions of the cylindrical portions 52 and 53 so as to form annular recesses therebetween. The annular ribs are adapted to enter these recesses and make sealing contact with the gaskets. The gaskets are preferably of square or rectangular cross-section, and present flat surfaces of appreciable width to the outer faces 28 and 29 of the ribs. The outer faces 28 and 29 are also preferably flat and of appreciable width so that they may initially engage the gaskets with an area contact of appreciable width. The parts are so formed and dimensioned that when the outer faces 28 and 29 initially engage the gaskets, the outer faces 69 and 70 of the flanges 67 and 68 will be spaced a slight distance from the respective transverse faces 30 and 31 of the adapters. Upon slight compression of the gaskets by the ribs, the gaskets will be distorted in the manner shown in Figure 4 and displaced gasket material 71 will flow into the counterbores 65 or 66. The parts are so formed and dimensioned that the displaced material 71 will preferably not contact the walls of the counterbores, although the parts may be dimensioned to allow such contact if desired. The close conformable fit of the reduced portions 44 and 45 accurately centers the retaining members with respect to the gaskets and the internal surfaces of the shuttle sleeve 35 and being concentric with the guide surfaces 52, 54, 53 and 55 facilitates accurate alignment of the various shuttle surfaces with the ribs and bores of the adapters.

The outer surface of the shuttle sleeve 36 has formed therein a pair of grooves 74 and 75 which form between them an annular ridge 76 having sloping sides 77 and 78.

The valve body has a central boss 79 into which is threaded a closed cap 80. The cap has a hole 81 formed therein and in which are located a spring 82 and a ball 83. The ball is adapted to seat on one or the other of the inclined sides 77 and 78 and, under the pressure of the spring 82, causes the shuttle to be urged against one or the other of the adapter ribs 26 and 27. A packing 84 seals the joint between the body and the cap.

The shuttle valve as illustrated in Figure 1 is primarily intended to be used in a hydraulic system having a main and an alternate source of fluid under pressure, only one of which is utilized at any given time. Thus the main source of fluid under pressure may be connected to the adapter 15 while the alternate source may be connected to the adapter 14. The outlet port 24 may then be connected to one of various hydraulic devices to which fluid under pressure is to be delivered.

With the main source of fluid pressure turned on and the alternate source turned off, fluid under pressure will enter the adapter 15 and force the shuttle 35 to seat upon the adapter 14, as shown in Figure 1, and prevent the escape of fluid under pressure from within the valve through the adapter 14. The fluid will then pass through the passages 57 and between the guide extensions 55 and 53 to the valve bore 11 around the flange 68 and out through the port 24.

During this time, the fluid will be acting upon the left hand end of the shuttle to hold the latter tightly seated against the adapter 14 with the rib 26 distorting the gasket 40 as shown in Figure 4 and with the distortion or compression limited by the contact of the end face 69 of the flange 67 with the adapter face 30. Any fluid which leaks by these contacting faces will enter the counterbore 65 and act upon the outer surface of the displaced portion 71 of the gasket. This will tend to distort the gasket into tighter sealing engagement with the outer face 28 of the adapter rib 26. Thus, the higher the fluid pressure, the more tightly will the gasket be seated against the rib.

It will also be noted that in the seated position as illustrated in Figure 4 the gasket is completely and closely confined at all points except along the outer face of the displaced portion 71. Thus there are no appreciable spaces or crevices into which the gasket can be extruded by the pressure of the fluid.

On the side of the shuttle which is unseated, see Figure 1, it will be noted that fluid pressure within the valve bore 11 will enter the counterbore 66 and act upon the gasket in such a manner as to force it more tightly into its place of confinement. Thus, there is no tendency for the gasket to be forced out of its recess by fluid pressure.

The length of the shuttle is such that at no time will it be completely withdrawn from either of the adapters 14 and 15. When the shuttle is in a seated position against one of the adapters, as for example against adapter 14 as shown in Figure 1, it will be noted that the cylindrical guide extension 54 is within the bore portion 16. On the opposite side the cylindrical guide portion 53 is withdrawn from the adapter 15 and the guide portion 55 is within the bore 17. Thus the only comparatively short bore portions 16 and 17 are utilized for guiding of the shuttle and there is less chance for the shuttle to bind because of any misalignment therebetween which might occur when the adapters are threaded into the valve body.

When the main source of pressure connected to adapter 15 fails or is turned off and the alternate source connected to the adapter 14 is turned on, the pressure of the fluid upon the right hand end of the shuttle will force the latter leftward until the ridge 76 passes under the ball 83 and the left hand end of the shuttle seats upon the adapter 15. The gasket 41 will then be seated upon the rib 27 and the flange 68 will engage the adapter face 31. This closes the adapter 15 to the interior of the valve and permits fluid under pressure to pass from the adapter 14 to the outlet 24. Fluid under pressure within the valve bore 11 which leaks past the engagement of the flange 68 and the adapter face 31 will enter the counterbore 66 and act upon the gasket 41 for more tightly seating the same against the rib 27 in the manner previously described.

Although the seat arrangement of the present invention is particularly adapted to shuttle valves of the type described, it may be used to advantage on other types of valves, as for example, check valves, reciprocating stop valves, etc. Also, it may be used in a reverse arrangement whereby the pressure to be sealed acts within the port which is being closed off rather than from within the valve chamber. In such case the gasket has a portion of its inner diametral surface exposed to fluid under pressure rather than its outer surface. Thus, for example, as shown in Figure 6, 87 may represent a portion of a valve body and 88 a portion of a valve chamber within such body, and 89 may represent a portion of a valve element within the valve chamber, which valve element is movable by any suitable means into and out of engagement with the inner end of an adapter 90 for opening and closing a port 91 in the adapter with respect to the valve chamber 88. Assuming that the port 91 is to be in communication with a source of fluid pressure, the gasket 92 is so confined that when the valve element 89 is closed against the adapter fluid under pressure within the port will have access to a portion of the inner diametral surface of the gasket for forcing the latter into tighter sealing engagement with the adapter.

In such case the end of the valve member 89 is formed with a threaded hole 93, a counterbore 94, and an undercut 95 at the bottom of the counterbore. The gasket 92 is lodged in the undercut and held therein by a retaining member 96, threaded into the threaded bore 93. The retaining member has a cylindrical portion 97 closely fitting the inner surface of the gasket and another cylindrical portion 98 of slightly smaller diameter than the inner diameter of the gasket and extending about half the length of the gasket. It also has a cylindrical guide extension 99 spaced from the portion 98 and having a close fit within the bore 91.

The inner end of the adapter 90 has an annular rib 100 which is adapted to enter the counterbore 94 and engage the gasket. Adjacent the rib 100 on the adapter is a transverse face 101 which is engageable with the end face 102 of the valve member for limiting the amount which the rib 100 may distort the gasket.

When the valve member is seated as illustrated, fluid under pressure within the port 91 enters the space between the cylindrical portion 98 and the inner diameter of the gasket and acts outwardly on the latter and tends to distort it into tighter sealing engagement with the end of the rib 100. The above modified form of the specific invention in this application is not claimed herein but is shown, described and claimed in a divisional application Ser. No. 398,019, filed December 14, 1953.

Although specific structures embodying the present invention have been shown and described it is obvious that they may be modified and changed in many ways and that the invention may be incorporated in other structures without departing from the scope of the invention as defined by the claims.

I claim:

1. A valve member for a double seated valve comprising a sleeve having a bore therethrough and a counterbore at each end of the bore, a distortable gasket in each counterbore, a retaining member in each end of the sleeve for retaining the respective gasket in the associated counterbore, said retaining members having a smooth cylindrical surface snugly fitting within the bore, said retaining members having another cylindrical surface adjacent the respective smooth cylindrical surface and spaced radially outward thereof and in engagement with the respective gasket, said retaining members being internally threaded at their inner ends, and an externally threaded stud engaged in the threads of both retaining members for holding the same in place.

2. A valve member for a double seated valve comprising a sleeve having a bore therethrough and a counterbore at each end of the bore, a distortable gasket in each counterbore, a retaining member in each end of the sleeve for retaining the respective gasket in the associated counterbore, said retaining members being threaded at their inner ends, a threaded member engaged with the threads of both retaining members for holding the same in place, the inner ends of the retaining members being serrated, a split lock washer between said inner ends, the ends of the washer at the split being turned outwardly in opposite directions and engageable with the serrated ends of the retaining members for preventing accidental unthreading of the latter.

3. A valve member for a double seated valve comprising a sleeve having a bore therethrough and a cylindrical counterbore at each end of the bore and concentric therewith, a retaining member mounted in each end of the sleeve, each of said retaining members having a first cylindrical surface snugly fitted within the bore and a second cylindrical surface within the respective counterbore and larger than the bore, and a third cylindrical surface on each retaining member adjacent the respective second cylindrical surface and of larger diameter thereof, a distortable gasket within each counterbore and in engagement with the respective second cylindrical surface, said retaining members being internally threaded at their inner ends, an externally threaded stud engaged in the threads of both retaining members for holding the same in place, said stud being free of engagement with said sleeve whereby said retaining members are centered solely by the engagement of said first cylindrical surfaces with said bore.

References Cited in the file of this patent

UNITED STATES PATENTS

| Number | Name | Date |
|---|---|---|
| 90,699 | Steward | Jan. 1, 1869 |
| 406,681 | Watts | July 9, 1889 |
| 694,773 | Morris | Mar. 4, 1902 |
| 841,336 | North | Jan. 15, 1907 |
| 870,806 | Turner | Nov. 12, 1907 |
| 1,609,641 | Christensen | Dec. 7, 1926 |
| 1,741,720 | Jolley | Dec. 31, 1929 |
| 2,354,791 | Boldt | Aug. 1, 1944 |
| 2,414,908 | Smith | Jan. 28, 1947 |
| 2,431,437 | Van Der Werff | Nov. 25, 1947 |
| 2,481,460 | Williams | Sept. 6, 1949 |

FOREIGN PATENTS

| Number | Country | Date |
|---|---|---|
| 349,520 | Great Britain | May 27, 1931 |
| 592,607 | Great Britain | Sept. 23, 1947 |